(12) United States Patent
Bidgood

(10) Patent No.: US 10,927,807 B1
(45) Date of Patent: Feb. 23, 2021

(54) WAVE-POWERED ELECTRICITY GENERATOR

(71) Applicant: Robert Bidgood, Shermans Dale, PA (US)

(72) Inventor: Robert Bidgood, Shermans Dale, PA (US)

( * ) Notice: Subject to any disclaimer, the term of this patent is extended or adjusted under 35 U.S.C. 154(b) by 0 days.

(21) Appl. No.: 16/813,852

(22) Filed: Mar. 10, 2020

(51) Int. Cl.
  *F03B 13/22* (2006.01)
  *B63B 35/44* (2006.01)
  *H02K 7/18* (2006.01)

(52) U.S. Cl.
  CPC .............. *F03B 13/22* (2013.01); *B63B 35/44* (2013.01); *H02K 7/1823* (2013.01); *B63B 2035/4466* (2013.01)

(58) Field of Classification Search
  CPC .......... F03B 13/22; F03B 13/12; F03B 13/14; F03B 13/141; F03B 13/144; F03B 13/145
  See application file for complete search history.

(56) References Cited

U.S. PATENT DOCUMENTS

| | | | |
|---|---|---|---|
| 7,298,054 B2 | 11/2007 | Hirsch | |
| 7,331,174 B2 | 2/2008 | Welch, Jr. | |
| D618,170 S | 6/2010 | Miller | |
| 8,723,350 B2 | 5/2014 | Vamvas | |
| 9,018,785 B2 | 4/2015 | Chua | |
| 10,415,439 B2 | 9/2019 | Radulescu | |
| 10,480,481 B2 | 11/2019 | Burkle | |
| 2017/0121924 A1* | 5/2017 | Orjavik | ..................... E02B 9/08 |

FOREIGN PATENT DOCUMENTS

WO          2016049596          3/2016

* cited by examiner

*Primary Examiner* — Viet P Nguyen

(57) ABSTRACT

The wave-powered electricity generator is an energy conversion device. The wave-powered electricity generator converts a potential energy formed in waves found in open water into rotational energy that can be used to power an electric generator. The open water is a body of naturally occurring water. The wave-powered electricity generator is a floating structure that is placed in the open water. The wave-powered electricity generator: a) captures water from the open water from a location that is above the median water level; b) forms a water flow path that transports the captured water into a turbine; wherein the turbine subsequently; c) generates rotational energy from the transported water. The wave-powered electricity generator comprises a containment pan, the turbine, and an anchor structure. The turbine mounts in the containment pan. The anchor structure anchors the floating invention to the bottom of the open water.

20 Claims, 6 Drawing Sheets

WAVE-POWERED ELECTRICITY GENERATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanical engineering including machines configured for use with liquids, more specifically, a power station configured for use with wave or tidal energy. (F03B13/12)

SUMMARY OF INVENTION

The wave-powered electricity generator is an energy conversion device. The wave-powered electricity generator converts a potential energy formed in waves found in open water into rotational energy that can be used to power an electric generator. The open water is a body of naturally occurring water. The open water is further defined with a median water level. The median water level is the delineation of a hypothetical horizontal plane that is positioned such that one half of the surface of the open water is superior to the median water level and one half of the surface of the open water is inferior to the median water level. The wave-powered electricity generator is a floating structure that is placed in the open water. The wave-powered electricity generator: a) captures water from the open water from a location that is above the median water level; b) forms a water flow path that transports the captured water into a turbine; wherein the turbine subsequently; c) generates rotational energy from the transported water. The wave-powered electricity generator comprises a containment pan, the turbine, and an anchor structure. The turbine mounts in the containment pan. The anchor structure anchors the floating invention to the bottom of the open water.

These together with additional objects, features and advantages of the wave-powered electricity generator will be readily apparent to those of ordinary skill in the art upon reading the following detailed description of the presently preferred, but nonetheless illustrative, embodiments when taken in conjunction with the accompanying drawings.

In this respect, before explaining the current embodiments of the wave-powered electricity generator in detail, it is to be understood that the wave-powered electricity generator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wave-powered electricity generator.

It is therefore important that the claims be regarded as including such equivalent construction insofar as they do not depart from the spirit and scope of the wave-powered electricity generator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
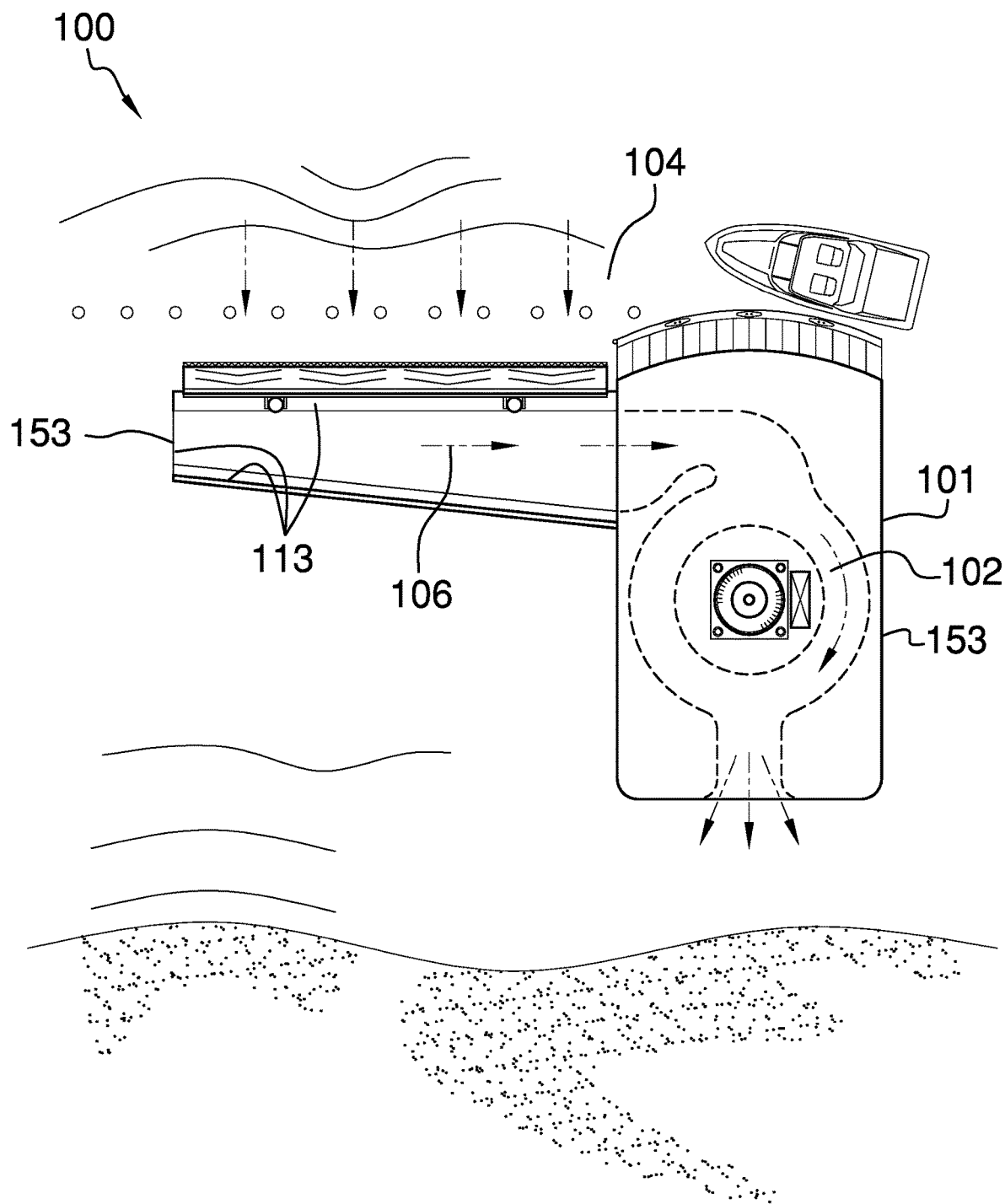
FIG. 1 is a top view of an embodiment of the disclosure.
Figure 2:
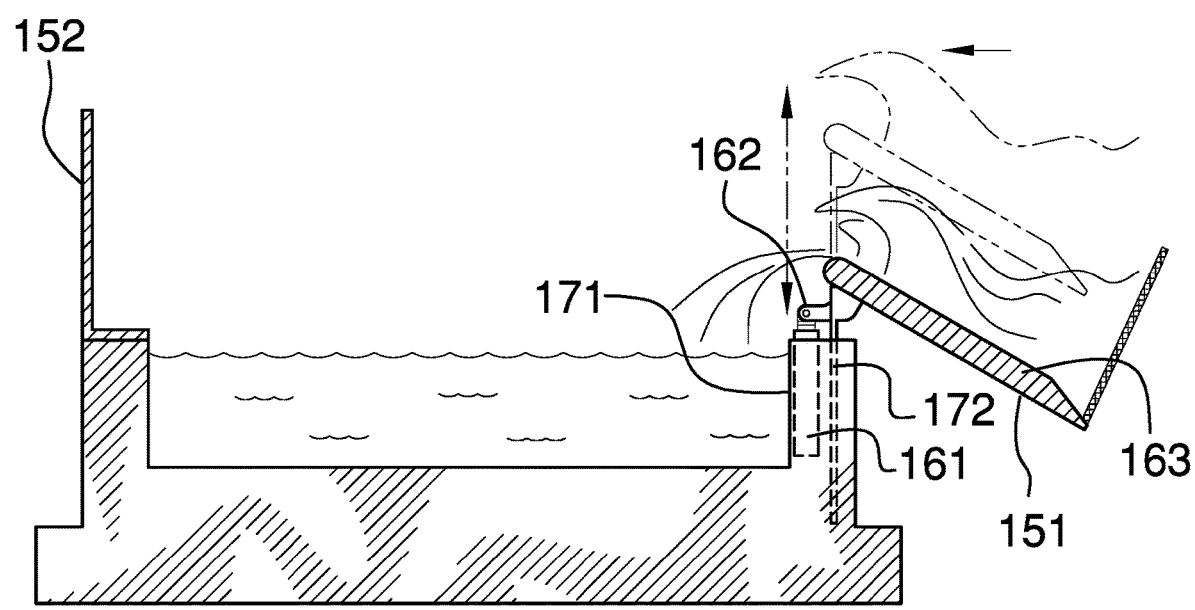
FIG. 2 is a side view of an embodiment of the disclosure.
Figure 3:
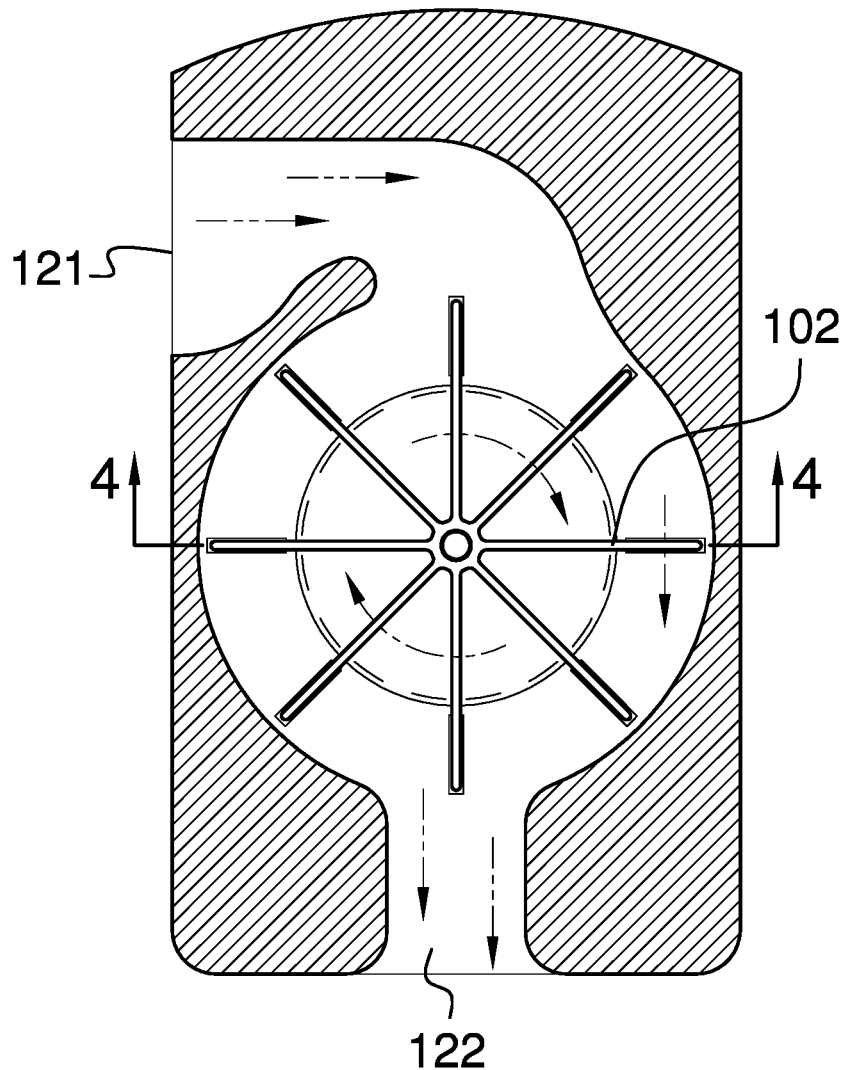
FIG. 3 is a detail view of an embodiment of the disclosure.
Figure 4:
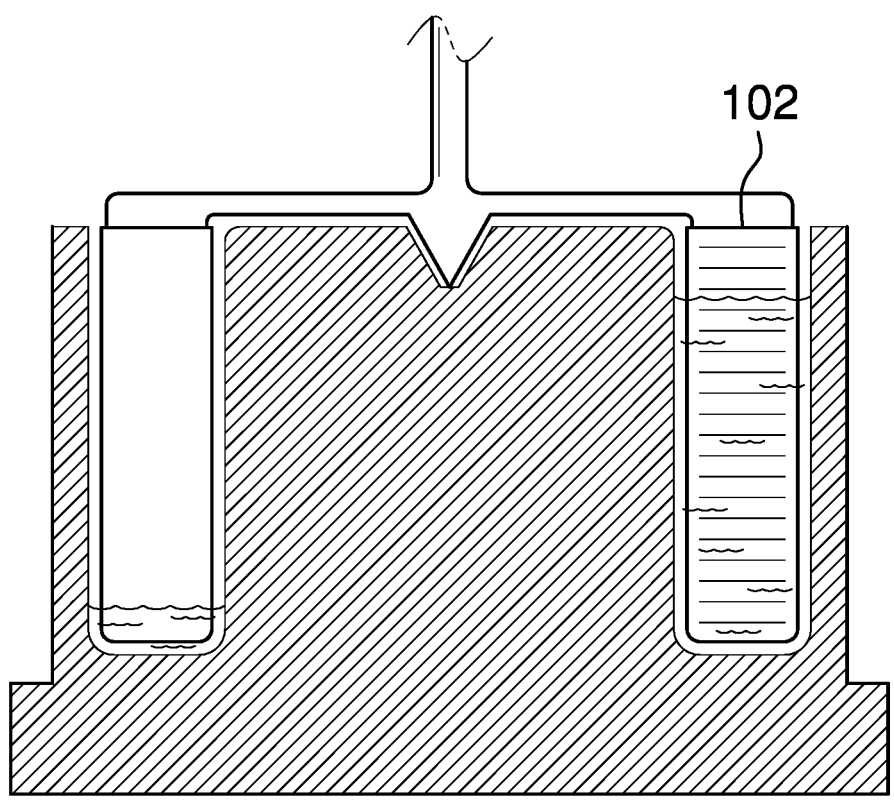
FIG. 4 is a cross-sectional view of an embodiment of the disclosure across 4-4 as shown in FIG. 3.
Figure 5:
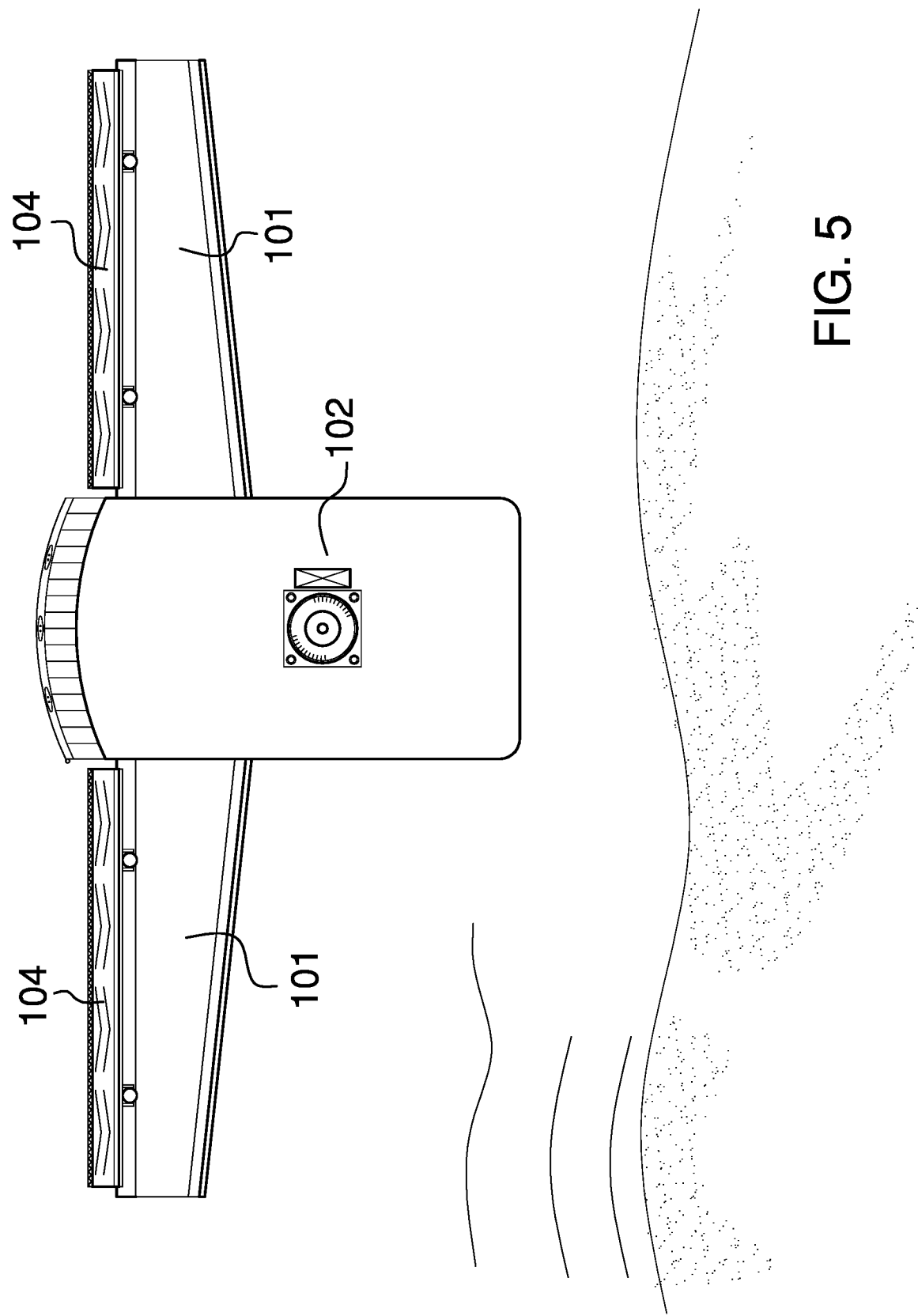
FIG. 5 is a top view of an alternate embodiment of the disclosure.
Figure 6:
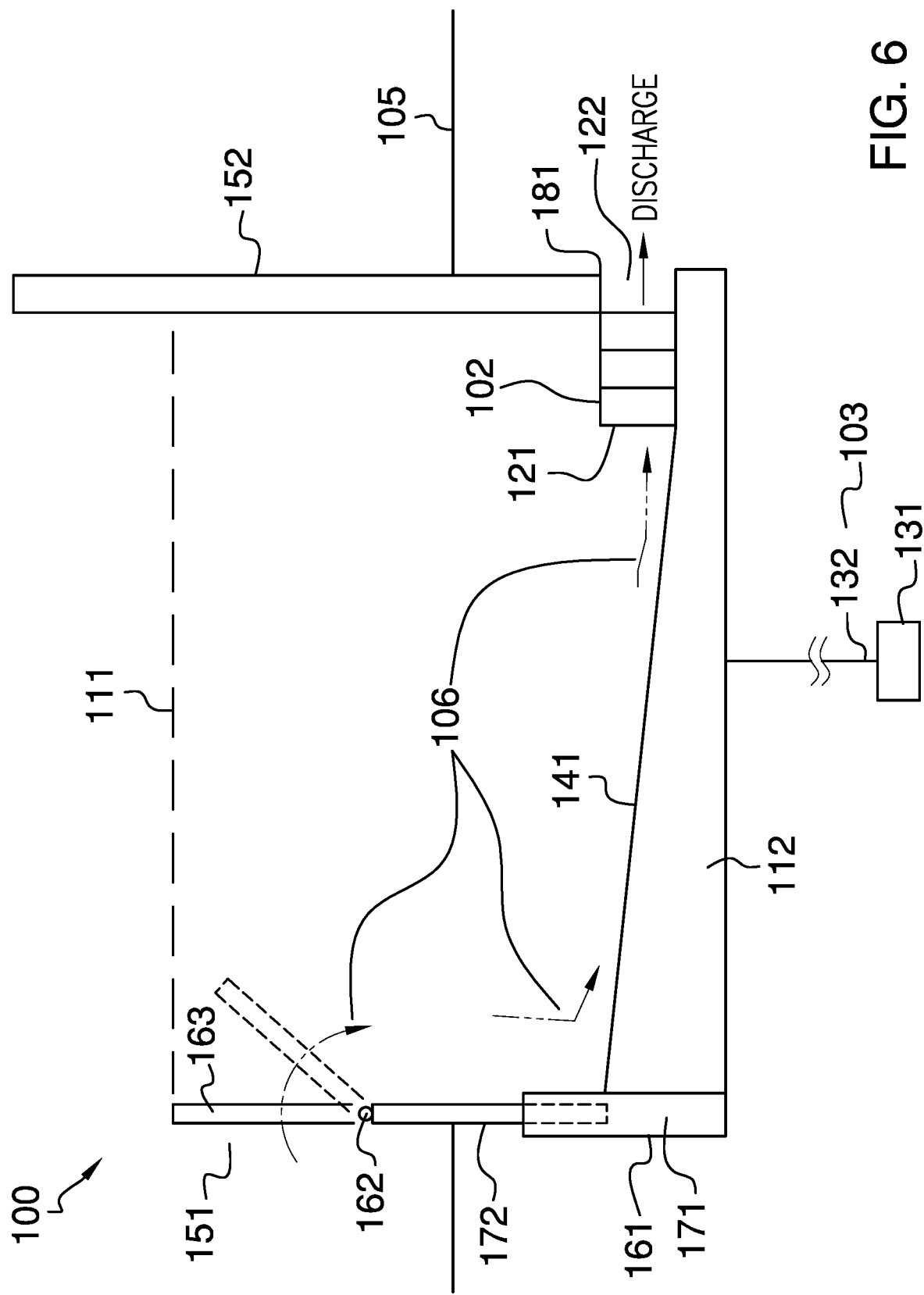
FIG. 6 is a schematic view of an embodiment of the disclosure.

Detailed reference will now be made to one or more potential embodiments of the disclosure, which are illustrated in FIGS. 1 through 6.

The wave-powered electricity generator 100 (hereinafter invention) is an energy conversion device. The invention 100 converts a potential energy formed in waves found in open water 104 into rotational energy that can be used to power an electric generator. The open water 104 is a body of naturally occurring water. The open water 104 is further defined with a median water level 105. The median water level 105 is the delineation of a hypothetical horizontal plane that is positioned such that one half of the surface of the open water 104 is superior to the median water level 105 and one half of the surface of the open water 104 is inferior to the median water level 105. The invention 100 is a floating structure that is placed in the open water 104. The invention 100: a) captures water from the open water 104 from a location that is above the median water level 105; b) forms a water flow path 106 that transports the captured water into a turbine 102; wherein the turbine 102 subsequently; c) generates rotational energy from the transported water.

The invention 100 comprises a containment pan 101, a turbine 102, and an anchor 131 structure 103. The turbine 102 mounts in the containment pan 101. The anchor 131 structure 103 anchors the floating invention 100 to the bottom of the open water 104.

The containment pan 101 is a hollow pan shaped structure. The containment pan 101 receives water from the open water 104 that is driven above the median water level 105 by wave action on the open water 104. The containment pan 101 forms a water flow path 106 that transports the potential gravitational energy contained in the received water to the turbine 102. The containment pan 101 is a floating structure. The containment pan 101 is tethered to the bed of the open water 104 by the anchor 131 structure 103. The containment pan 101 is configured to freely rotate into a previously determined position relative to the direction of the wave action on the open water 104. The containment pan 101 comprises an open face 111, a closed face 112, and a plurality of lateral faces 113.

The open face 111 is the superior congruent end of the pan structure of the containment pan 101. The open face 111 is horizontally oriented. The open face 111 forms the aperture through which the water received from the open water 104 enters into the containment pan 101.

The closed face 112 is the inferior congruent end of the pan structure of the containment pan 101. The closed face 112 is a horizontally oriented structure. The closed face 112 is the congruent end of the containment pan 101 that is distal from the open face 111. The buoyancy of the containment pan 101 is designed such that the closed face 112 of the containment pan 101 is continuously submerged below the median water level 105 closed face 112 of the containment pan 101. The closed face 112 further comprises an interior cant 141.

The interior cant 141 is a slope that is formed on the interior surface of the closed face 112. The slope formed by the interior cant 141 routes any water that enters the containment pan 101 directly to the turbine 102 inlet 121 of the turbine 102.

The plurality of lateral faces 113 form the vertical containment barriers of the containment pan 101. The buoyancy of the containment pan 101 is designed such that a portion of each of the plurality of lateral faces 113 of the containment pan 101 is continuously submerged below the median water level 105 of the open water 104. The buoyancy of the containment pan 101 is designed such that a portion of each of the plurality of lateral faces 113 of the containment pan 101 floats above below the median water level 105 of the open water 104. The plurality of lateral faces 113 are designed such that the wave action of the open water 104 forces water over and through the plurality of lateral faces 113 into the containment structure of the containment pan 101. The plurality of lateral faces 113 further comprises a proximal lateral face 151, a distal lateral face 152, and a plurality of containment lateral faces 153.

The proximal lateral face 151 is the lateral face of the pan structure of the containment pan 101 that is proximal to the waves formed on the open water 104 as the fall upon the containment pan 101. The distal lateral face 152 is the lateral face of the pan structure of the containment pan 101 that is distal from the proximal lateral face 151. The plurality of containment lateral faces 153 are the lateral faces of the pan structure that attach the proximal lateral face 151 to the distal lateral face 152. The proximal lateral face 151, the distal lateral face 152, and the plurality of containment lateral faces 153 form the vertically oriented containment barriers of the containment pan 101.

The proximal lateral face 151 further comprises a hydraulically operated barrier 161, a hinge 162, and a rotating barrier 163.

The hydraulically operated barrier 161 forms the inferior structure of the proximal lateral face 151. The hydraulically operated barrier 161 is a telescopic structure. The span of the length of the hydraulically operated barrier 161 is adjustable. The hydraulically operated barrier 161 adjusts the span of the vertical length of the proximal lateral face 151 above the median water level 105 of the open water 104. The hydraulically operated barrier 161 is a hydraulic device that uses a pressurized hydraulic fluid to adjust the position of the adjustable barrier 172 of the hydraulically operated barrier 161 relative to the static barrier 171 of the hydraulically operated barrier 161.

The hinge 162 is a fastening structure. The hinge 162 is a spring-loaded hinge 162. The hinge 162 attaches the rotating barrier 163 to the superior face of the adjustable barrier 172 such that the hinge 162 is in its relaxed shape when the rotating barrier 163 is parallel to the adjustable barrier 172. The orientation of the hinge 162 is such that the adjustable barrier 172 will rotate towards the interior of the containment pan 101 when a wave from the open water 104 strikes the adjustable barrier 172.

The rotating barrier 163 is a prism-shaped structure. The rotating barrier 163 is a disk-shaped structure. The rotating barrier 163 attaches to the adjustable barrier 172 of the hydraulically operated barrier 161 such that the congruent ends of the disk structure of the rotating barrier 163 are vertically oriented when the hinge 162 is in its relaxed shape.

The hydraulically operated barrier 161 further comprises a static barrier 171 and an adjustable barrier 172.

The static barrier 171 is a hollow prism-shaped structure. The static barrier 171 is a disk-shaped structure. The static barrier 171 forms the inferior structure of the proximal lateral face 151. The static barrier 171 is oriented such that the congruent ends of the disk structure of the static barrier 171 are vertically oriented. The aperture that provides access to the hollow interior of the static barrier 171 is formed in the superior lateral face of the static barrier 171. The static barrier 171 contains a hydraulic device.

The adjustable barrier 172 is a hollow prism-shaped structure. The adjustable barrier 172 is a disk-shaped structure. The adjustable barrier 172 is oriented such that the congruent ends of the disk structure of the adjustable barrier 172 are vertically oriented. The adjustable barrier 172 inserts telescopically into the static barrier 171. The hydraulic device contained in the static barrier 171 adjusts the position of the adjustable barrier 172 of the static barrier 171. The elevation of the rotating barrier 163 above the median water level 105 is determined by the position of the adjustable barrier 172 in the static barrier 171.

The distal lateral face 152 further comprises a discharge port 181. The discharge port 181 is an aperture formed through the distal lateral face 152.

The turbine 102 is a mechanical device. The turbine 102 converts the momentum contained in a fluid flow into rotational energy. Specifically, the turbine 102 receives the water transported through the water flow path 106 and converts the momentum contained in the water flow. The turbine 102 is defined elsewhere in this disclosure. This disclosure assumes that the rotational energy generated by the turbine 102 is used to power the operation of an electric generator. The turbine 102 further comprises a turbine 102 inlet 121 and a turbine 102 discharge 122.

The turbine 102 inlet 121 is a port that is formed in the turbine 102. The turbine 102 inlet 121 receives the water discharged from the water flow path 106 into the turbine 102 for conversion into rotational energy. The turbine 102 discharge 122 is a port that is formed to discharge water from the turbine 102 after the potential energy contained in the water flowing through the turbine 102 has been extracted. The turbine 102 discharge 122 of the turbine 102 mounts in the discharge port 181.

The anchor 131 structure 103 is a mechanical structure. The anchor 131 structure 103 secures, or anchors, the containment pan 101 to the bed of the open water 104. The anchor 131 structure 103 comprises an anchor 131 and an anchor 131 cord 132.

The anchor 131 is a high density and high mass object that rests on the bed of the open water 104. The anchor 131 forms an anchor point to which the containment pan 101 attaches. The anchor 131 holds the containment pan 101 in a relatively stationary position while allowing the containment pan 101 to rotate relative to the direction of the wave action on the open water 104. The anchor 131 cord 132 is a cord that attaches the closed face 112 of the containment pan 101 to the anchor 131. The anchor 131 cord 132 has tensile strength but no compressive strength. In the first potential embodiment of the disclosure, the anchor 131 cord 132 is a chain. The cord is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Barrier: As used in this disclosure, a barrier is a physical obstacle that forms a boundary between a first space and a second space. The barrier prevents the passage of an object between the first space and the second space.

Bed: As used in this disclosure, a bed refers to the ground that forms the bottom of a body of water. Ground that is temporarily submerged under water is referred to as a flood bed.

Buoyancy: As used in this disclosure, buoyancy refers to a property of an object that floats in a liquid. The object that floats in the liquid is referred to as buoyant. Buoyancy specifically refers to the situation where the mass of the liquid that is displaced when a buoyant object is placed in the liquid is greater than the mass of the object itself. In this instance, the pressure of the displaced liquid will raise the buoyant object such that the buoyant object floats.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chain: As used in this disclosure, a chain is a series of interlinked rings that form a cord like structure. Like a cord, a chain has tensile strength but is too flexible to provide compressive strength and is not suitable for use in pushing objects. The rings to form a chain are often formed from a metal.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord. A chain can also be considered a cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal: As used in this disclosure, distal refers to a directional sense or location of the body. Specifically, distal refers to a first object or a side of a first object that is distal from the medial axis or more proximal to from the side of the body relative to a second object or side of a second object.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Float: As used in this object, float refers to an object that is buoyant, or does not sink into, a liquid.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that is coaxially mounted in the stator. The rotation of the rotor within the stator physically generates the electrical energy. A generator can generate an electrical voltage selected from the group consisting of an AC voltage and a DC voltage. When a DC voltage is generated, this disclosure assumes that the term generator includes commutator and electrical circuitry required to generate a regulated DC voltage.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure.

Inferior: As used in this disclosure, the term inferior refers to a directional reference that is parallel to and in the same direction as the force of gravity when an object is positioned or used normally.

Liquid: As used in this disclosure, a liquid refers to a state (phase) of matter that is fluid and that maintains, for a given pressure, a fixed volume that is independent of the volume of the container.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Perimeter: As used in this disclosure, a perimeter is one or more curved or straight lines that bounds an enclosed area on a plane or surface. The perimeter of a circle is commonly referred to as a circumference.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Proximal: As used in this disclosure, the term proximal is used to describe the relative location of two objects. The proximal object is the object that is closer to a specified reference point.

Relaxed Shape: As used in this disclosure, a structure is considered to be in its relaxed state when no shear, strain, or torsional forces are being applied to the structure.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Tether: As used in this disclosure, a tether is a cord, line, webbing, or strap that is attached to an object to restrict its movement.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternatively, a turbine can run in a reverse mode wherein externally provided rotational energy will be converted into kinetic energy that is expressed as the movement or compression of a fluid or gas.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wave: As used in this disclosure, a wave is a mechanism capable of transferring energy without transferring mass. Specifically, a wave refers to a transfer of momentum or energy through an object or medium such that there is no significant change in the relative positions of the particles (or molecules) that make up the object or medium.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wave-powered electricity generator comprising:
a containment pan, a turbine, and an anchor structure;
wherein the turbine mounts in the containment pan;
wherein the wave-powered electricity generator is an energy conversion device;
wherein the wave-powered electricity generator converts a potential energy formed in waves found in open water into rotational energy generated by the turbine to power an electric generator;
wherein the open water is a body of naturally occurring water;
wherein the open water is further defined with a median water level;
wherein the median water level is the delineation of a hypothetical horizontal plane that is positioned such that one half of the surface of the open water is superior to the median water level and one half of the surface of the open water is inferior to the median water level;
wherein the anchor structure anchors the floating wave-powered electricity generator to the bottom of the open water;
wherein the containment pan comprises an open face, a closed face, and a plurality of lateral faces;
wherein the plurality of lateral faces further comprises a proximal lateral face, a distal lateral face, and a plurality of containment lateral faces;
wherein the proximal lateral face further comprises a hydraulically operated barrier, a hinge, and a rotating barrier;
wherein the hinge attaches the rotating barrier to the hydraulically operated barrier;
wherein the orientation of the hinge is such that the rotating barrier will rotate towards the interior of the containment pan when a wave from the open water strikes the rotating barrier;
wherein the hydraulically operated barrier further comprises a static barrier and an adjustable barrier;
wherein the static barrier contains a hydraulic device;
wherein the adjustable barrier inserts telescopically into the static barrier;
wherein the hydraulic device contained in the static barrier adjusts the position of the adjustable barrier in the static barrier;
wherein the elevation of the rotating barrier above the median water level is determined by the position of the adjustable barrier in the static barrier.

2. The wave-powered electricity generator according to claim 1
wherein the wave-powered electricity generator is a floating structure that is placed in the open water;
wherein the wave-powered electricity generator: a) captures water from the open water from a location that is above the median water level; b) forms a water flow path that transports the captured water into a turbine; wherein the turbine subsequently; c) generates rotational energy from the transported water.

3. The wave-powered electricity generator according to claim 2
wherein the containment pan is a hollow pan shaped structure;
wherein the containment pan receives water from the open water that is driven above the median water level by wave action on the open water;
wherein the containment pan forms a water flow path that transports the potential gravitational energy contained in the received water to the turbine.

4. The wave-powered electricity generator according to claim 3
wherein the containment pan is a floating structure;
wherein the containment pan is tethered to the bed of the open water by the anchor structure;
wherein the containment pan is configured to freely rotate into a previously determined position relative to the direction of the wave action on the open water.

5. The wave-powered electricity generator according to claim 4
wherein the turbine is a mechanical device;
wherein the turbine converts the momentum contained in a fluid flow into rotational energy;
wherein specifically, the turbine receives the water transported through the water flow path and converts the momentum contained in the water flow.

6. The wave-powered electricity generator according to claim 5
wherein the anchor structure is a mechanical structure;

wherein the anchor structure secures, or anchors, the containment pan to the bed of the open water.

7. The wave-powered electricity generator according to claim 6
wherein the open face is the superior congruent end of the pan structure of the containment pan;
wherein the open face forms the aperture through which the water received from the open water enters into the containment pan;
wherein the closed face is the congruent end of the containment pan that is distal from the open face;
wherein the plurality of lateral faces form the vertical containment barriers of the containment pan.

8. The wave-powered electricity generator according to claim 7
wherein the turbine further comprises a turbine inlet and a turbine discharge;
wherein the turbine inlet is a port that is formed in the turbine;
wherein the turbine discharge is a port that is formed in the turbine.

9. The wave-powered electricity generator according to claim 8
wherein the anchor structure comprises an anchor and an anchor cord;
wherein the anchor cord is a cord that attaches the closed face of the containment pan to the anchor.

10. The wave-powered electricity generator according to claim 9
wherein the open face is horizontally oriented;
wherein the closed face is a horizontally oriented structure;
wherein the closed face is the inferior congruent end of the pan structure of the containment pan;
wherein the buoyancy of the containment pan is designed such that the closed face of the containment pan is continuously submerged below the median water level of the open water;
wherein the water flow path is formed in the closed face of the containment pan.

11. The wave-powered electricity generator according to claim 10
wherein the proximal lateral face is the lateral face of the pan structure of the containment pan that is proximal to the waves formed on the open water as the fall upon the containment pan;
wherein the distal lateral face is the lateral face of the pan structure of the containment pan that is distal from the proximal lateral face.

12. The wave-powered electricity generator according to claim 11
wherein the plurality of containment lateral faces are the lateral faces of the pan structure that attach the proximal lateral face to the distal lateral face;
wherein the proximal lateral face, the distal lateral face, and the plurality of containment lateral faces form the vertically oriented containment barriers of the containment pan.

13. The wave-powered electricity generator according to claim 12
wherein the hydraulically operated barrier forms the inferior structure of the proximal lateral face;
wherein the hinge is a fastening structure.

14. The wave-powered electricity generator according to claim 13
wherein the hinge is a spring-loaded hinge;
wherein the hinge attaches the rotating barrier to the superior face of the adjustable barrier such that the hinge is in its relaxed shape when the rotating barrier is parallel to the adjustable barrier.

15. The wave-powered electricity generator according to claim 14
wherein the hydraulically operated barrier is a telescopic structure;
wherein the span of the length of the hydraulically operated barrier is adjustable;
wherein the hydraulically operated barrier adjusts the span of the vertical length of the proximal lateral face above the median water level of the open water;
wherein the hydraulically operated barrier is a hydraulic device that uses a pressurized hydraulic fluid to adjust the position of the adjustable barrier of the hydraulically operated barrier relative to the static barrier of the hydraulically operated barrier.

16. The wave-powered electricity generator according to claim 15
wherein the rotating barrier is a prism-shaped structure;
wherein the rotating barrier is a disk-shaped structure;
wherein the rotating barrier attaches to the adjustable barrier of the hydraulically operated barrier such that the congruent ends of the disk structure of the rotating barrier are vertically oriented when the hinge is in its relaxed shape.

17. The wave-powered electricity generator according to claim 16
wherein the static barrier is a hollow prism-shaped structure;
wherein the static barrier is a disk-shaped structure;
wherein the static barrier forms the inferior structure of the proximal lateral face;
wherein the static barrier is oriented such that the congruent ends of the disk structure of the static barrier are vertically oriented;
wherein the aperture that provides access to the hollow interior of the static barrier is formed in the superior lateral face of the static barrier;
wherein the adjustable barrier is a hollow prism-shaped structure;
wherein the adjustable barrier is a disk-shaped structure;
wherein the adjustable barrier is oriented such that the congruent ends of the disk structure of the adjustable barrier are vertically oriented.

18. The wave-powered electricity generator according to claim 17
wherein the closed face further comprises an interior cant;
wherein the interior cant is a slope that is formed on the interior surface of the closed face;
wherein the slope formed by the interior cant routes any water that enters the containment pan directly to the turbine inlet of the turbine;
wherein the turbine inlet receives the water discharged from the water flow path into the turbine for conversion into rotational energy;
wherein the turbine discharge is a port that is formed to discharge water from the turbine after the potential energy contained in the water flowing through the turbine has been extracted.

19. The wave-powered electricity generator according to claim 18
wherein the distal lateral face further comprises a discharge port;
wherein the discharge port is an aperture formed through the distal lateral face;

wherein the turbine discharge of the turbine mounts in the discharge port.

20. The wave-powered electricity generator according to claim 19
wherein the anchor is a high density and high mass object that rests on the bed of the open water;
wherein the anchor forms an anchor point to which the containment pan attaches;
wherein the anchor cord has tensile strength but no compressive strength;
wherein the anchor cord is a chain.

\* \* \* \* \*